United States Patent [19]

Reinke

[11] 4,428,791

[45] Jan. 31, 1984

[54] PROCESS AND APPARATUS FOR PRODUCING COMPOSITE BUILDING PANELS, AND PANELS PRODUCED THEREBY

[75] Inventor: Fritz Reinke, Erbach, Fed. Rep. of Germany

[73] Assignee: Fritz Reinke Engineering, Erbach, Fed. Rep. of Germany

[21] Appl. No.: 205,127

[22] Filed: Nov. 10, 1980

[30] Foreign Application Priority Data

Nov. 13, 1979 [DE] Fed. Rep. of Germany ....... 2945752

[51] Int. Cl.³ .............................................. B32B 5/00
[52] U.S. Cl. .................................. 156/161; 52/223 R; 52/309.16; 52/785; 52/807; 156/178; 156/179; 156/278; 156/301; 156/302; 156/307.3; 156/324; 428/114
[58] Field of Search ............... 156/161, 301, 178, 302, 156/179, 307.3, 278, 324, 166, 297; 428/114; 52/309.16, 223 R, 785, 807; 144/344

[56] References Cited

U.S. PATENT DOCUMENTS

| | | | |
|---|---|---|---|
| 1,514,561 | 11/1924 | Morreale | 428/114 |
| 1,977,199 | 10/1934 | Osgood | 156/302 |
| 2,927,623 | 3/1960 | Huisman et al. | 156/179 |
| 3,246,058 | 4/1966 | Voelker | 156/179 |
| 3,705,829 | 12/1972 | Brenneman et al. | 156/178 |
| 3,960,630 | 6/1976 | Pataki et al. | 156/190 |

Primary Examiner—John J. Gallagher
Attorney, Agent, or Firm—James C. Wray

[57] ABSTRACT

In a process and apparatus for the production of composite building panels, bars are laid against a rotating drum, parallel to each other and close together. Parallel threads or wires which extend in the direction of the drum periphery are then would around the outside of the bars, in a stressed condition, whereby the bars being transported by the drum are pressed against the peripheral surface thereof. The bars are connected by a hardenable binding agent to fibers and a thin sheet of suitable material which move with the drum, and the binding agent is caused to harden, thereby forming a first strip on the drum. The first strip is then brought into a condition of extending parallel to a second strip produced in the same manner, with an adhesive between the two strips. The two strips are then passed through a pair of rollers which press the assembly together, thereby forming an elongate panel configuration.

45 Claims, 18 Drawing Figures

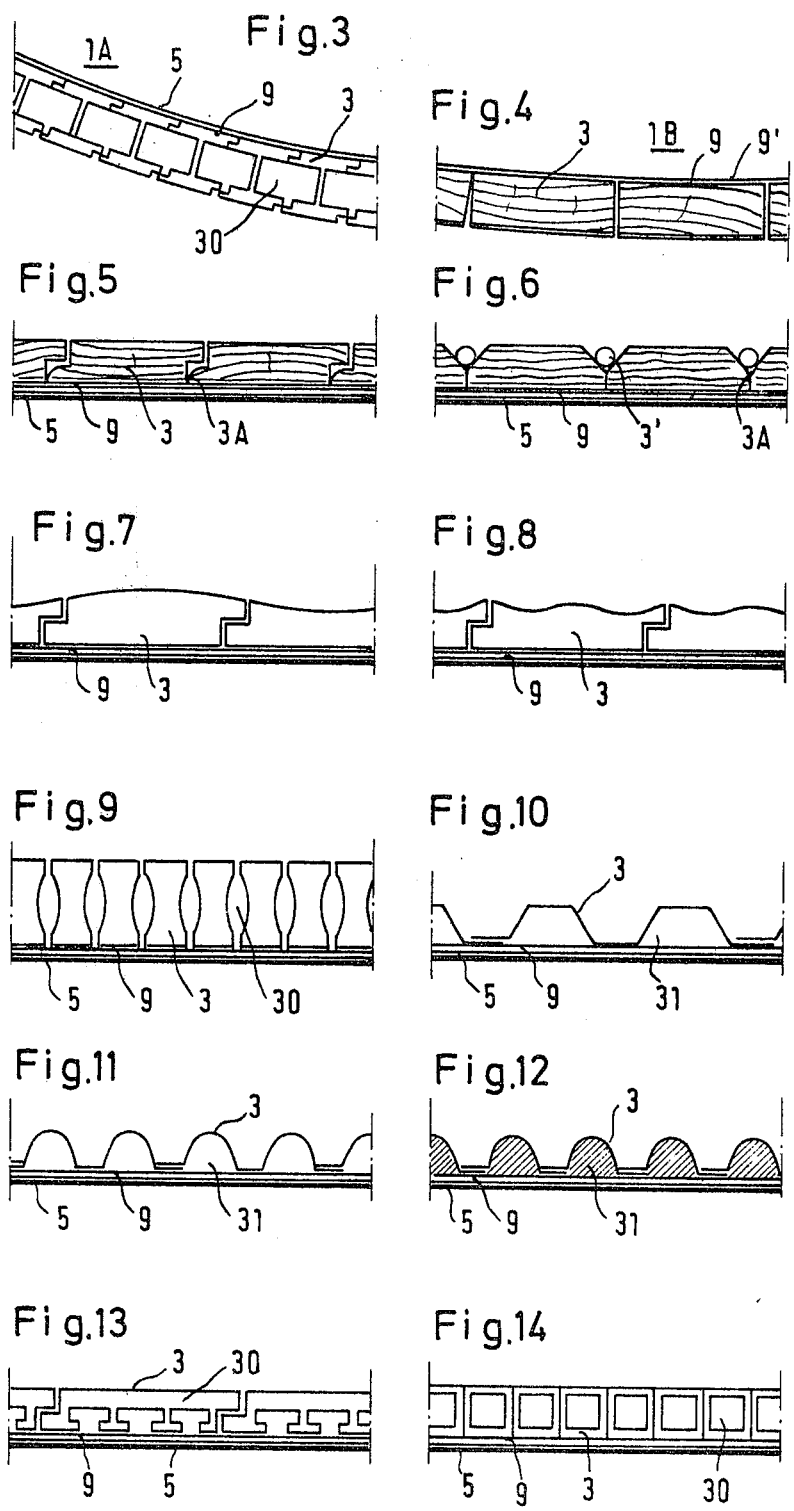

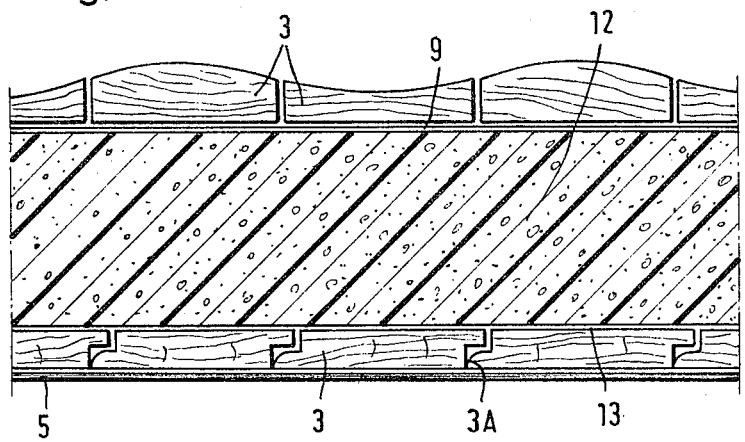
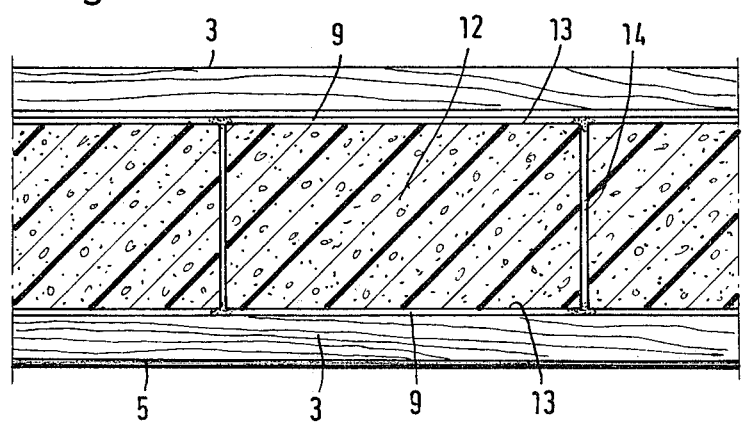
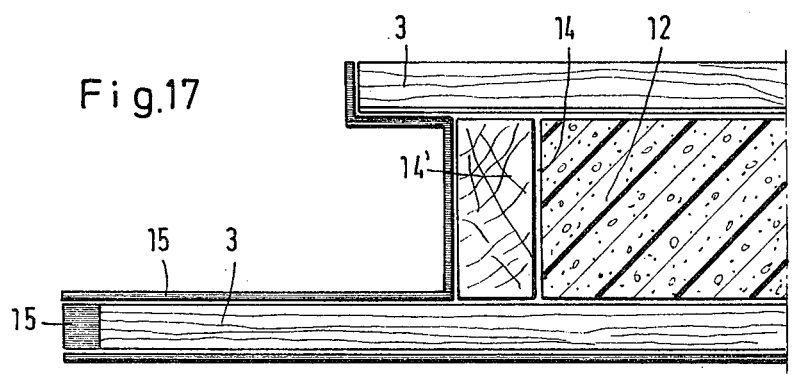

4,428,791

PROCESS AND APPARATUS FOR PRODUCING COMPOSITE BUILDING PANELS, AND PANELS PRODUCED THEREBY

BACKGROUND OF THE INVENTION

The invention is concerned with a process and apparatus for the production of composite building panels for the outside walls of buildings and the like.

Walls of buildings and similar structures, this including outside walls, may be produced by using building panels of various forms. Particularly when building barrack-like structures and in the case of prefabricated buildings, the building structure often comprises a load-carrying skeleton which may comprise for example wooden beam members, and chipboard panels which clad the skeleton structure internally and externally, thus providing a cavity-type wall. In many cases however, this mode of construction is unsatisfactory and in some cases in particular is still too expensive. Furthermore, in some cases, gypsum or plaster panels or plaster board panels of various forms are used to produce walls, but it will be appreciated that such panels, by virtue of the nature of the material used, are not suitable for outside walls or cladding, and are too weak for many purposes.

SUMMARY OF THE INVENTION

An object of the invention is to provide a composite building panel which does not suffer from the disadvantages of the above-discussed panels.

A further object of the present invention is to provide a composite building panel which combines sufficient strength and resistance to influences such as weathering, whereby it can be used for external wall cladding, with low cost.

A still further object of the invention is to provide a method of producing a composite building panel which makes use of currently available materials and which can be readily put into practice.

Still another object of the present invention is to provide an apparatus for the production of composite building panels which are suitable also for use as external wall cladding.

These and other objects are achieved by a process and apparatus for the production of composite building panels for walls of buildings and the like, wherein shaped bar members are applied in a condition of being parallel to each other and in close succession, to the periphery of a drum which rotates about its axis. The bar members are moved slowly forward by the drum and then, downstream of the position (relative to the direction of movement of the drum) at which the bar members were applied to the drum, a substantial number of threads or wires which are arranged parallel to each other and which extend in the direction of the drum periphery are wound around the outside of the bar members on the drum, in a stressed condition, whereby the bar members which are being advanced by the drum are pressed with a prestressing force against the drum peripheral surface. The bars are joined by means of a hardenable binding agent which is applied in a fluid condition, to fibers and a thin sheet of a suitable material which moves round with the drum. Hardening of the binding agent may be accelerated by suitable means such as heat radiation, whereby the components of the assembly (bar members, threads or wires and binding agent) leaving the drum form a first strip of composite construction. A second strip is produced in a similar manner, for example on a second drum, and the two strips are then brought into a condition of extending parallel to each other. An adhesive joining or bonding agent is introduced between the two strips, for example being applied to the face of at least one strip, and the two strips with the bonding agent therebetween are then passed between the rollers of at least one pair of rollers, which press the two strips together and on to the bonding agent, thereby forming an elongate panel construction.

The mode of operation of the process and apparatus may be continuous, thereby producing a panel structure of substantially elongate configuration, which may then be cut to length and size as required.

For the production of composite building panels of enhanced strength and mechanical resistance, the bar members, when applied to the rotating drum, may be disposed at an acute angle of preferably less than 45° to a straight line extending parallel to the axis of the drum, while the bar members of the two interconnected strips may intersect each other or cross in the final elongate assembly.

The composite building panels which are produced in this way have been found to be particularly suitable in areas where wood, sand (for concrete), gypsum and the like are available and the panels can be produced at very low cost, thereby permitting the construction of residences for people and/or buildings for storing goods, which can be produced inexpensively.

If good heat insulation is required, then, before the two strips are joined together to form the composite structure, a plurality of connecting ribs which extend substantially in the direction of movement of the strips may be inserted between the strips, being disposed one beside the other, in the direction of movement thereof. Heat-insulating material may then be introduced into the spaces formed within the composite structure, between the connecting ribs.

Various service facilities such as pipes, electric wires, and other conduits or installations may be included in the composite building panels in the course of production thereof. Furthermore, the finished panels leaving the production process may be provided with a final surface seal in order to enhance their resistance to external influences such as weathering and the effect for example of atmospheric acid.

Thus, the building panel produced by the process and apparatus of the present invention is particularly suitable inter alia for the walls of houses, the outside walls of large structures and buildings, cold-storage rooms, partitioning walls, intermediate floor members which are required to withstand a loading, silos, vehicle structures, containers for the packaging and transportation of goods for example on trucks, and other large-scale containers of all kinds, while in some forms of the panels, they are also suitable for use for producing water containers, swimming pools, pools for fire extinguishing purposes and the like.

BRIEF DESCRIPTION OF THE DRAWINGS

FIGS. 3 through 14 show views in cross-section of various embodiments of the strips which form an intermediate stage in the production of the composite building panel of this invention and which are subsequently to be joined together to form the composite panel, FIG. 15 shows a view in longitudinal section through a composite building panel which comprises two strips and an intermediate layer therebetween, FIG. 16 shows a view in cross-section through a composite building panel as shown in FIG. 15

FIG. 17 shows a view in cross-section through one edge of a composite building panel according to the invention, which is particularly suitable as the foot or base section of a house and outside wall.

DESCRIPTION OF THE PREFERRED EMBODIMENTS

Figure 1:
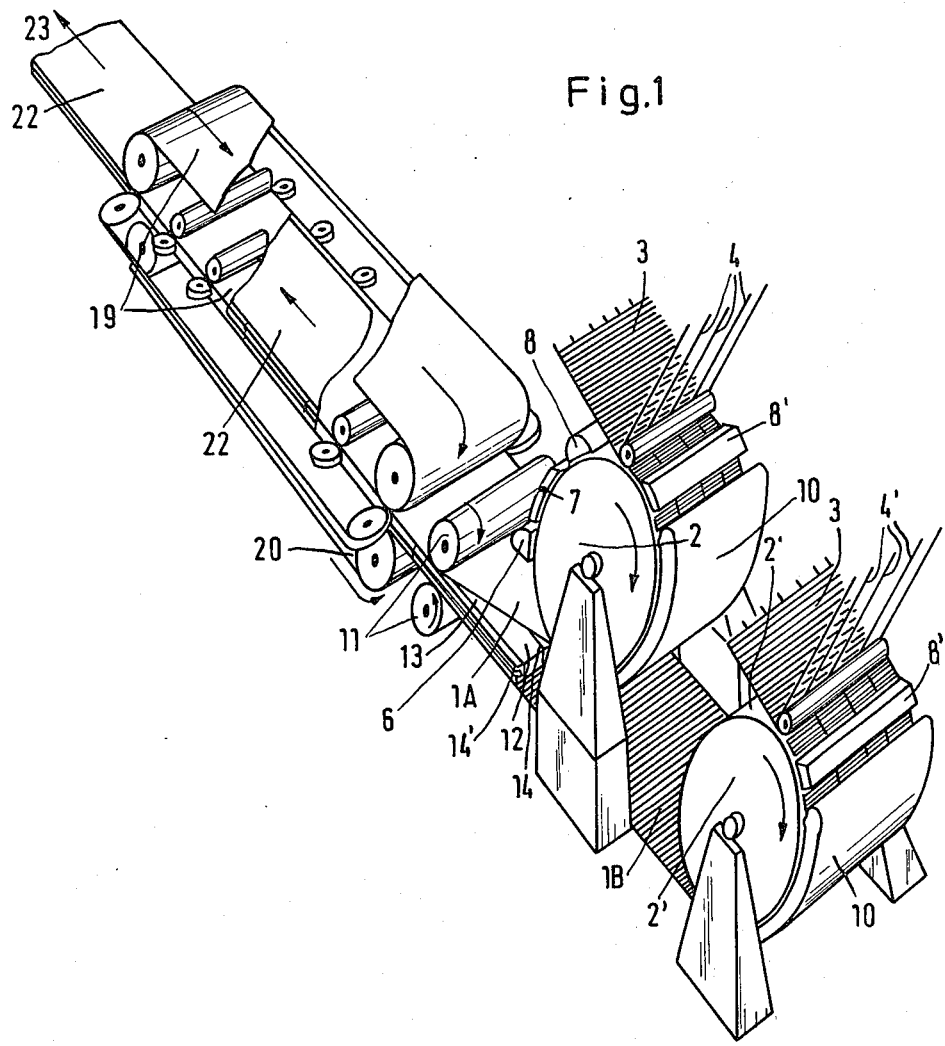
FIG. 1 shows a diagrammatic and simplified view of apparatus for performing the process according to this invention.

Reference is first made to FIG. 1 which shows a greatly simplified and diagrammatic view of apparatus for performing a process according to the principles of this invention. Looking therefore at FIG. 1, two strips 1A and 1B which are to be joined together to constitute a building panel are produced in a continuous mode by means of two synchronously rotating drums indicated at 2 and 2'. Shaped bar members 3 are applied to the two drums in quick succession, that is to say, at a small spacing from each other, and parallel to the axes about which the two drums rotate.

A larger number of threads or wires 4 and 4' respectively, hereinafter referred to for the sake of simplicity as 'thread means', which are arranged parallel to each other and which extend in the peripheral direction of the drum as can be clearly seen from the drawing, are wound around the outside of the bar members 3 on the drums, in a stressed condition, in such a way that the bar members 3 are pressed against the peripheral surface of the respective drums by the prestressing force of the thread means.

Before the bar members 3 are applied to the respective drum 2, the drum 2 is covered with a gel coat layer indicated at 5 which is produced by spraying on fluid hardenable plastic material by means of a suitable device as indicated at 6, and hardening of the plastic material by heating by means of a heater device indicated at 7. Thereupon, a layer 9 comprising fibres and fluid hardenable plastic material is applied to the foregoing structure of bars and hardened plastic material, by means of a suitable device indicated at 8. The bar members 3 are then pressed against the drum by the thread means 4 and 4' respectively. By means of rhythmic impacts or striking actions against the bar members, the layer of fibres ano fluid hardenable plastic materials therebelow is caused to compact. The structure passes through a tunnel heater 10 or heating tunnel which causes the plastic materials to harden. Before the strip 1A leaves the drum 2, the fluid plastic material has set so that the bar members 3 are at the same time fixedly joined to the glass fibre reinforced plastic layer.

A second strip 1B is also produced on the drum 2', as briefly indicated above. First of all, the bar members 3 are applied to the blank drum 2' and pressed firmly against the peripheral surface of the drum by means of the thread means 4' wound therearound. Then, a layer 9 of fibres with fluid hardenable plastic material is applied to the bar members from the outside, by means of a suitable device 8', the layer 9 covering the bar members 3 and being compacted by rhythmic shocks or blows, or other suitable means. By the time the strip 1B leaves the drum, the glass fibre reinforced plastic layer 9 of the strip 1B has also hardened.

The two strips 1A and 1B are then passed between two rollers 11 of at least one pair of rollers, to compress the assembly. In this operation, insulating material 12, for example plates or panels of plastic foam, and adhesive material 13, may also be introduced between the two strips. Reinforcing ribs comprising glass fibre reinforced plastic 14 or wood 14' may also be introduced between the strips, while shaped closure members 15 may be inserted at the edges of the strips. All these components are pressed together by means of the rollers 11.

If the two strips are provided with insides which are adapted to be nailed, reinforcing ribs 14' which are also adapted to be nailed, and edge members 15 which are similarly adapted to be nailed, then, after mechanical adhesion together downstream of the rollers 11, the operating procedure is already concluded because any additional binding agents, glue and the like which may be used in regard to the panel structure, can also be allowed to harden outside the illustrated apparatus.

In a preferred form of the invention however, after the components of the panel structure have been pressed together by the rollers 11, the compressed elongate panel structure is maintained continuously under a low pressure force, over a distance of 8 to 12 meters for example, by means of moving belts 19 and 20, until the finished and fully hardened elongate panel structure 22 leaves the apparatus.

At the locations at which the strips come together to meet at the elongate panel structure 22, air is sucked out so as to produce a reduced pressure, by means of a suction device (not shown in FIG. 1), thereby causing the strips to come together properly, without for example the formation of air bubbles or other defects. The strips are motor-driven and may thus be used to provide for continuous conveying movement of the elongate panel structure 22 in the direction indicated by arrow 23, so that there is no need to provide a special or separate drive arrangement for the drums 2 and 2'.

After the composite structure leaves the above-described apparatus, it can be cut to length as required in known manner, and, if appropriate, provided with openings for windows, doors and similar structures.

A further layer 9' (see for example FIG. 4) may also be applied to the hardened layer 9 comprising fibres and plastic material, to act as a sealing or barrier layer in order to give enhanced resistance to weathering influences, chemicals and like effects. In some cases it may be desirable for the layer 9' not to be applied only after the elongate panel structure 22 is finished, but at the stage of producing the strip 1B, in the region of the drum 2'.

On the outside surfaces, which are shown as being the top surfaces in FIG. 1, of the strip 1A which is produced on the drum 2, the composite panels have a smooth surface as the outwardly disposed gel coat layer 5 was produced directly on the blank or smooth surface of the drum. On the outside surface of the strip 1B which is produced on the drum 2' being the surface which is shown underneath in FIG. 1, the composite panels have a structured surface which is formed by the outwardly disposed layer of fibers and hardenable plastic material.

If it is desired to produce composite building panels in which an outside surface is formed by the bar members, then, when producing the strip 1A on the drum 2, the constituent materials thereof are applied to the drum in the same sequence as described hereinbefore with regard to production of the strip 1B on the drum 2. In that case however, no gel coat layer is sprayed on to the drum 2 by the device 6 and the layer comprising fibers and fluid hardenable plastic material is sprayed on by means of the device 8', instead of the device 8. After leaving the drum 2, the bar members 3 are then on the outside surface of the strip 1A, being the upper surface as shown in FIG. 1. The composite panels which are then made from the resulting elongate panel structure are highly suitable for making the walls of rooms, or interior walls, on which the bar members which comprise for example gypsum or plaster are to be covered with wallpaper, or on which shaped strip members of wood are to be fitted, to provide a wall cladding.

Figure 2:
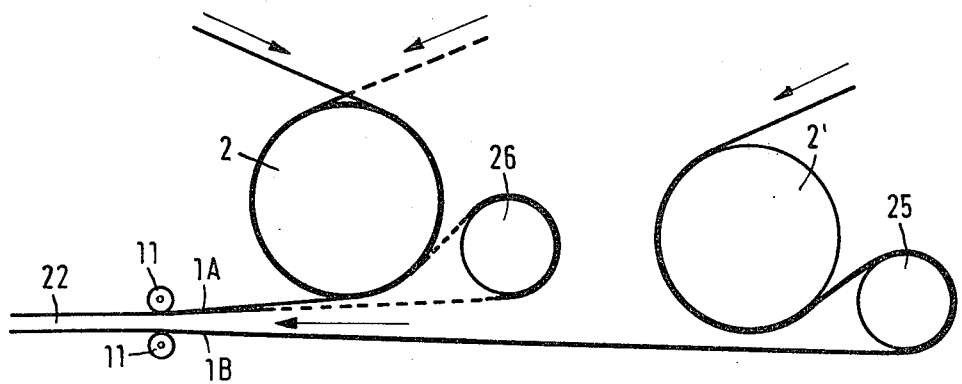
FIG. 2 is a diagrammatic view illustrating an alternative form of the process according to this invention and the apparatus suitable for the performance thereof.
Figure 18:
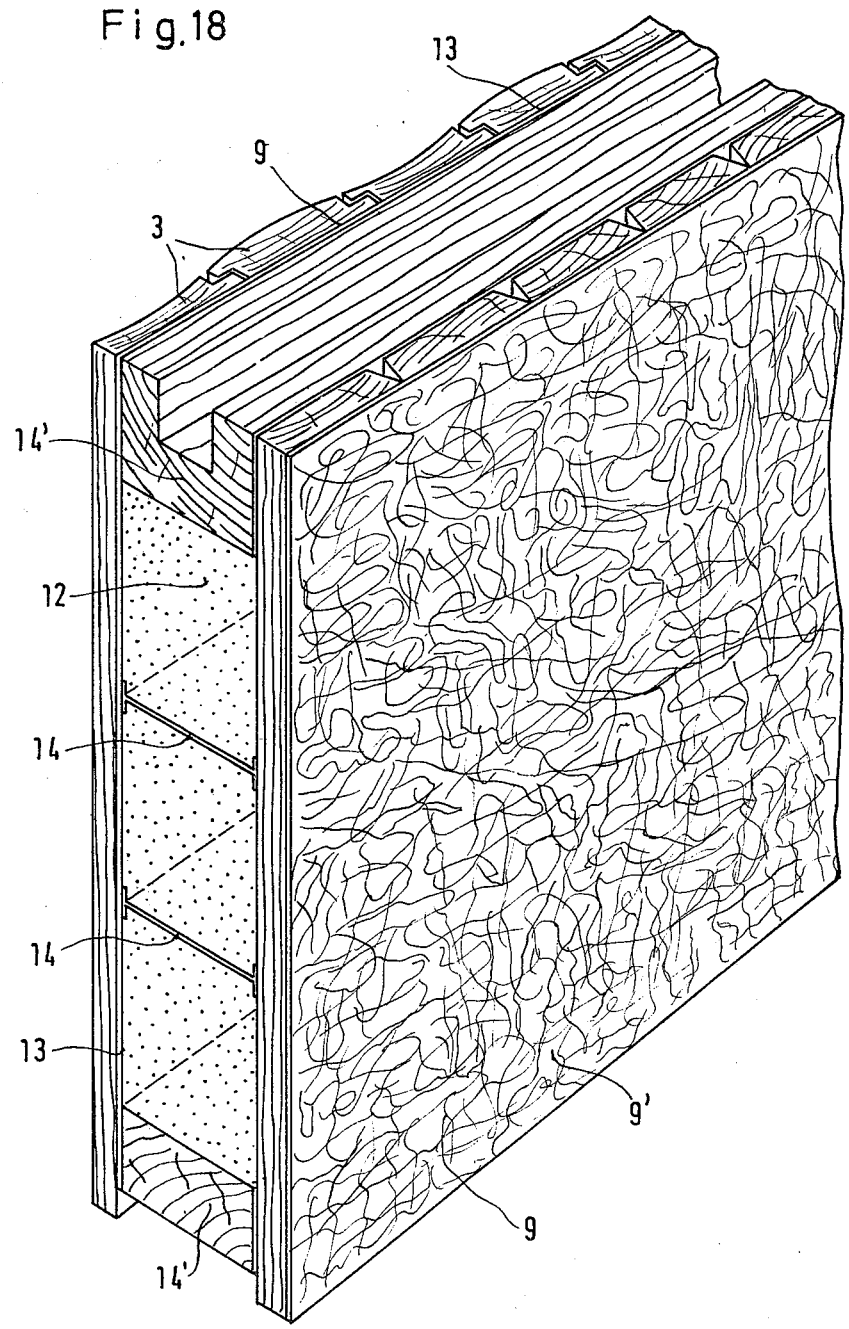
FIG. 18 shows an isometric view of an embodiment of the building panel according to the invention, having two lateral shaped closure bar members at edges thereof, and two connecting ribs within the panel.

If however it is desired to produce composite panels in which the bar members are visible on both outward surfaces, the strip 1A is produced on the drum 2 in the manner described hereinbefore; however, when producing the strip 1B, the direction in which the drum 2' is supplied with materials must be changed, and the strip 1B must be taken around a direction-changing roller 25 (FIG. 2) after leaving the drum 2'. FIG. 2 shows a greatly simplified view of this mode of production of composite panels of this kind.

If however both outside surfaces of the composite panel are to have a fibrous structure, the strip 1B is produced in the manner shown in FIG. 1, while the strip 1A is in principle produced in the same manner as strip 1B, except that the drum 2 is supplied with materials in the opposite manner, as indicated by a broken line in FIG. 2. Furthermore, and as a consequence, the strip 1A is passed around a direction-changing roller 26 before being taken between the two rollers 11. The individual strips 1A and 1B can therefore be produced in various ways, and many different combinations can be achieved. It is possible therefore to produce a number of different kinds of surfaces, which can be combined together in any desired manner.

Reference will now be made to FIGS. 3 through 14 which show cross-sectional views of various alternative forms of the strips 1A and 1B respectively, which can be produced in the general manner described hereinbefore. Two such strips are pressed together, using the above-described process, to form a respective elongate panel structure 22, and it is therefore possible to produce composite building panels with the most widely varying kinds of surface configuration and nature.

Reference is therefore first made to FIG. 3 which shows a strip 1A which is provided with an external gel coat layer 5, a subsequent layer 9 of fibers and plastic material, and shaped bar members 3 which are substantially in the cross-sectional shape of a double-T configuration, as can be clearly seen from FIG. 3. Spaces or cavities are formed between the bar members 3, as indicated at 30. This configuration in respect of the bar members, and the provision of the cavities 30, gives a higher level of strength or moment of resistance, while being of low weight. Furthermore, the cavities serve to release vapour diffusion, to install electrical equipment and the like, and can preferably also be used for the introduction into the panel of other materials for improving strength, sound-insulation or heat-insulation. Preferred materials for such purposes are mineral insulating materials, sand or cement mortar, or concrete.

Reference is now made to FIG. 4 which shows a view in cross-section through a strip 1B which has been produced on the second drum 2' in FIG. 1. The shaped bar members 3, which in this arrangement are of a rectangular cross-sectional configuration, are firmly adherred to the fiber plastic material layer 9 which is covered with a sealing or barrier layer 9'.

FIG. 5 shows a panel construction in which the shaped bar members 3 have projecting and rounded-off lugs or noses 3A. The projections 3A lie directly against the associated surface of the adjacent bar member so that the hardening fibers-plastic material layer cannot penetrate into the spaces between the bar members.

In FIG. 6, additional bar members 3' which may comprise for example steel, hard aluminium or aluminium alloy or fibre-plastic material are inserted into the spaces between adjacent shaped bar members 3, the bar members 3 being so shaped as to form spaces of a V-shaped configuration. The additional bar members 3' are intended to provide an additional mechanical stiffening action.

FIGS. 7 through 9 show strips which have bar members of various configurations. The embodiments of FIGS. 7 and 8 are preferred in this respect, if the surface of the panel is formed by wooden shaped bar members which remain visible in the finished panel. It will be seen from FIGS. 7 and 8 that each bar member has a respective projection at each end thereof, forming a stepped configuration adapted to co-operate with the corresponding edge configuration of the adjacent bar member. The top surface (as viewed in FIGS. 7 and 8) of each bar member is curved, the bar members of FIG. 7 being curved upwardly and downwardly, or being convex and concave respectively, from one bar member to the adjacent bar member. In FIG. 8, the top surface of each bar member is wavy or corrugated, as can be clearly seen.

In FIG. 9, the bar members are of a 'waisted' configuration, thereby forming intermediate spaces or cavities as indicated at 30, between adjacent bar members. In FIG. 10, the bar members are of a hollow construction, forming cavities 31 therein, while also giving a wavy or corrugated external configuration. It will be seen that the bar members have edge portions which overlap each other so as to hold each other mutually in position.

In FIG. 11, the bar members are again hollow, forming cavities 31, and are of a wavy or corrugated configuration. In both FIGS. 10 and 11, the bar members have been shown as hollow with the cavities 31 therein empty, but it will be seen from FIG. 12 that the cavities 31 may also be filled with a suitable material if required.

In FIGS. 13 and 14, the shaped bar members comprise drawn or pressed metal or other suitable material, or plastic material shaped members which are produced by an endless production method, such as extrusion, or the like. Thus, in FIG. 13, the bar members comprise a body portion forming a cavity 30, with a plurality of support legs or feet which may also be hollow and communicate with the cavity 30. In FIG. 14, the bar members comprise square tubes also forming a cavity 30.

Reference is now made to FIG. 15 which shows a view in longitudinal section, and FIG. 16 which shows a view in cross-section, of a composite building panel which employs the shaped bar members 3 shown in FIG. 5, in one strip, and shaped bar members 3 which are somewhat similar to the shaped bar members 3 shown in FIG. 7, in the other strip. The panel also includes connecting ribs 14 comprising glass reinforced plastic, with insulating panels 12 comprising plastic foam disposed between respective pairs of ribs 14. The nature and positioning of the reinforcing ribs 14 and the insulating panels 12 are clearly shown in FIG. 16, while the configurations of the respective bar members forming the underside and the top side of the panel can be seen from FIG. 15. Reference numeral 13 in FIGS. 15 and 16 denotes the adhesive connection between the strips formed by the shaped bar members 3, and the intermediate layer therebetween.

It will be appreciated that the composite building panels produced by the process and apparatus of this invention, as described hereinbefore, enjoy in particular the following advantages:

The external cover layers of the composite components are greatly superior to the chipboard panels which are nowadays often employed in prefabricated structures, in regard to load-carrying capacity, resistance to weathering, adaptability of configuration in regard to surface structure, colour and so on, and in regard to mechanical strength, while also being considerably less expensive than the previously employed panels.

For example, a composite member according to the present invention, while having approximately the same functional properties, is so superior, in regard to manufacturing costs, to a composite panel, in the form of a sandwich panel, which has for example external cover layers of about 3 mm glass fiber-reinforced plastic materials, that, depending on the form in which it is produced, it is only about one third to one half the cost of the sandwich-type panel.

Whereas capital investment costs of the order of magnitude of thousands of dollars are generally required for producing chipboard panels, plywood panels and the like, which are preferably used as external panel layers (strips) for wall elements in prefabricated buildings, the investment costs for production equipment for making shaped members of a bar-like configuration, as are used in the present invention, are very low in comparison. Particularly low levels of capital investment are required for equipment for producing shaped bar members from wood as shaped cross-sectional configurations which only measure for example a maximum of about 10 mm×30 mm can be produced by simple cutting blades or rotary pairing blades, therefore also giving the advantage that there are no losses due to cutting off material (that is to say, no sawdust or sawwaste), at least in some embodiments of the present panel.

Shaped wooden members with cross-sectional configurations of this order of size can be out directly from the trunk of a tree because they dry quickly and without the formation of large stress cracks, due to the favourable relationship between volume and surface area, and can be processed after a short storage time, by the application of the process and apparatus according to the invention, to form strips and composite panels.

An important advantage of the present invention is that the natural original strength of the tree or wood, in the grain direction of the shaped wooden members, is retained. In contrast to this, wood which has been broken down into small chips and then glued together again to form chipboard panels has completely lost the original strength to be found in the natural wood.

Among the most important characteristics of the panel of the present invention is the combination of the very thin layers of glass fiber-reinforced plastic material, and the bar-like shaped members which are secured by adhesive (by a polymerisation action for example), transversely with respect to the direction of production of the strips.

The endless strip comprising a thin layer of glass fibre-reinforced plastic material, which is bonded to the shaped bar members only on one side, ensures extremely high levels of tensile strength in the longitudinal and transverse directions, but the edge of the strip remains resilient (restrictedly bendable) during the production procedure, in a direction which is transverse with respect to the direction of the shaped bar members. This is the important characteristic for achieving a simple and fully continuous production mode. In this connection, the stiffness or rigidity of the strip in a direction which is transverse with respect to the direction of production or the direction of movement of the strips through the apparatus, being due to the shaped bar members, is important with regard to the production procedure and the high bending strength, buckling strength and compression strength in a vertical direction, for example in a finished wall.

As the outer cover layers of the composite panels enjoy optimum stiffening in one plane by virtue of the shaped bar members, the thin fibrous layer has in particular its most important function, in regard to strength qualities, in the direction of production, that is to say, in the finished wall panel, in the longitudinal direction of the subsequently built wall (the horizontal direction).

A layer of glass fiber-reinforced polyester resin which is only 0.8 mm in thickness, as is preferably used for the outside walls of houses and like structures, can carry an overall maximum tensile load, in a wall which is 2.50 meters in height, of 24 000 kg, in the longitudinal direction of the wall, with a tensile loading of specifically about 12 kg/mm$^2$, so that, if the wall has a similar inner and outer cover layer, the overall load that could be carried would even be about 48 000 kg.

This quality ensures optimum resistance even to very extreme loadings (hurricane, earthquake and so on). In addition, the building panel has unparalleled resistance, which cannot be compared to any paint or other covering, to the influences of weathering and even to acids with an etching action, chemicals and the like. The configuration and colouring of the panels are virtually without limitation. Major damage can be easily repaired by an able man, even a man who is not skilled in this respect. The strips which are still bendable in the direction of production (with outer cover layers comprising chipboard, plywood and other panels, a production procedure of this kind would be impossible to perform), are pressed against the rollers 11 which serve as sizing or calibrating rollers, and are connected thereby.

It is at the rolling station that the complete composite panel is also stiffened and strengthened in the horizontal direction (that is to say, with respect to the composite panel when it is subsequently erected for example as part of a house wall), by the intermediate layers which are introduced directly upstream of the compressing rollers 11, thus providing a mode of operation which is very inexpensive and highly effective from the functional and procedural point of view.

An important consideration in this respect is that connecting ribs in the form of shaped metal members, wooden members and the like can be inserted in the direction of the shaped bar members, upstream of the compressing rollers 11, thereby to provide further stiffening and reinforcement for example for connecting points for roof trusses or beams, and the like.

The apparatus and process according to the present invention also make it possible for pipes, electrical conduits, installation cavities and the like to be easily formed in the composite panels upstream of the compressing rollers.

After the panel construction 22 leaves the machine (see FIG. 1), the components which are already of the required width are cut to length and provided with apertures for windows, doors and the like. The portions which are cut out to form such apertures are collected and subsequently re-used as core material, producing composite components with even higher strength values, as this particular construction has two cover layers virtually on each side.

The excellent qualities of the lightweight composite panels ensure that the element is an ideal element, that is to say, it is of the optimum configuration from the engineering point of view and can be precisely calculated statically in advance. In this connection, it will be appreciated that, besides its superior properties in regard to strength and its equally unparalleled qualities in regard to resistance to external weathering and even to acid atmospheric conditions and the like, the panel also has a surface which can be of virtually any desired configuration according to circumstances and requirements, and the panel can also be readily nailed when the components thereof are of a suitable material such as wood.

A further important consideration in this respect is that the finished panels leaving the machine can also be provided with a final surface sealing or barrier layer, as shown for example in FIG. 4.

In summary therefore, the composite panel according to the present invention is particularly suitable inter alia for the walls of houses, the outside wall cladding of large structures, cold-storage rooms, partitioning or dividing walls, intermediate floor structures which are required to be capable of withstanding a certain loading, silos, vehicle constructions, containers for the transportation of goods and large containers of all kinds, while some forms of the panel as described are also suitable for forming containers for water such as swimming pools, fire extinguishing ponds or pools and the like.

It will be appreciated that many modifications and variations may be made in respect of the above-described process, apparatus and panel, without thereby departing from the spirit and scope of the present invention; for example, in an alternative form of the process, a thin web of paper, jute or the like may be applied to the drum, a hardenable fluid binder is then applied to the web, for example by spraying, and the bar members are then applied to the binder. Alternatively, the bar members and the thread means may be put on the drum and the above-mentioned thin web may then be applied thereto, light rhythmic forces or blows then being applied to the structure for compacting thereof. Likewise, various forms of insulation in the panel may be employed, such as mineral material for example rock wool, or insulation in loose form.

What is claimed is:

1. A process for the production of composite panels wherein a plurality of bar members are disposed on the periphery of a rotatable drum, parallel to each other and at small spacings from each other, rotation of the drum causing a slow advance movement of the bar member assembly, wherein, downstream of the location at which the said bar members are applied to the drum, a plurality of thread means which are disposed parallel to each other and which are oriented in the peripheral direction of the drum are wound around the outside of the bar members on the drum, the thread means being wound in a stressed condition whereby the bar members on the drum are pressed against the peripheral surface thereof by a prestressing force, wherein the bar members are joined by means of a hardenable plastic bonding agent which is applied in fluid form to fibres and a thin layer of suitable material which are disposed around the drum, wherein said bonding agent on the drum is caused to harden, thereby to form a first strip structure, wherein said first strip structure is disposed in a parallel condition with respect to a second strip structure produced in substantially a similar manner, with an adhesive joining agent between the two strip structures, and wherein the two strip structures with said joining agent are passed between pressing means for pressing the two strip structures together and against the joining agent thereby to form an elongate panel structure.

2. A process as set forth in claim 1 wherein the hardening of said hardenable bonding agent is accelerated by the application of heat.

3. A process as set forth in claim 1 wherein said bar members are disposed on the periphery of said drum at an acute angle with respect to the axis of the drum.

4. A process as set forth in claim 3 wherein the inclined bar members of one said strip structure are disposed at an angle to the bar members of the other said strip structure, whereby the bar members of the two strip structures cross each other.

5. A process as set forth in claim 3 wherein said angle is less than 45°.

6. A process as set forth in claim 1 wherein said bar members are applied to the drum substantially parallel to the axis thereof.

7. A process as set forth in claim 1 wherein, before the two strip structures are joined together by said joining agent, a plurality of reinforcing means which extend substantially in the direction of movement of the strip structures are inserted between the two strip structures, one beside another, in the direction of movement of the strip structures.

8. A process as set forth in claim 7 wherein insulating material is inserted in cavities between said reinforcing means.

9. A process as set forth in claim 1 wherein a gel coat layer is first applied to the rotating drum, wherein said layer is then heated to initiate polymerisation thereof, a layer of fibres and fluid hardenable plastic material is then applied to said gel coat layer, wherein the bar members are then applied to said fibre-plastic material layer, and wherein rhythmic forces are only then applied to said bar members which are pressed against said fibre-plastic material layer.

10. A process as set forth in claim 1 wherein, after said bar members have been disposed on said drum and after said thread means have been wound in a stressed condition around said bar members, a mixture of fibres with fluid hardenable plastic material is applied thereto, thereby to cover the bar members.

11. A process as set forth in claim 1 wherein a thin web of a material selected from a group including paper and jute is applied to the rotating drum, a hardenable fluid binder is then applied to said thin web of material and wherein said bar members are then applied to said binder and web combination.

12. A process as set forth in claim 11 wherein said binder is applied by spraying.

13. A process as set forth in claim 1 wherein, after the bar members have been applied to the drum and after the thread means have been wound therearound in a stressed condition, a thin web of a material selected from a group comprising paper and jute is applied thereto from the outside, wherein a hardenable fluid binder is then applied to said web, and wherein light rhythmic forces are then applied to the cover layer formed by said web and binder.

14. A process as set forth in claim 1 wherein panels of insulating material are inserted in an uninterrupted succession between said two strip structures, the faces of said insulating material panels which are towards said two strip structures being covered with hardenable plastic material.

15. A process as set forth in claim 1 wherein at least two reinforcing ribs which extend in the direction of movement of said strip structures and which are disposed one beside another are inserted between said two strip structures and wherein adjacent cavities defined between said reinforcing ribs are filled with mineral insulating material.

16. A process as set forth in claim 1 wherein reinforcing ribs are inserted between said two strip structures, said ribs comprising glass fibre plastic material and being formed in the course of the process from a mixture of glass fibres and fluid hardenable plastic material between said strip structures and inserted foam panels.

17. A process for the production of composite panels wherein a plurality of bar members are applied to the periphery of a rotating drum, the bar members being disposed on the drum in close succession and parallel to each other and being advanced slowly by said drum, a large plurality of thread means which extend parallel to each other and which extend in the direction of rotation of the drum periphery are wound around the bar members on said drum, in a stressed condition thereby to press said bar members against the peripheral surface of the drum, wherein said bar members are joined by means of a hardenable plastic binding agent which is applied in substantially fluid form to fibres and a thin layer of a suitable material which are also disposed around said drum, wherein hardening of said binding agent is expedited by accelerator means, thereby to produce an assembly forming a first strip structure, wherein said steps of applying bar members and thread means to a said drum and applying binding agent and fibres and a thin layer of material to a said drum, followed by hardening of said binding agent, are repeated thereby to form a second said strip structure, wherein said two strip structures are bonded together to form an elongate panel configuration, and wherein said elongate panel configuration is cut into composite panels.

18. A process as set forth in claim 17 including reinforcing means within said panel, between said first and second strip structures.

19. A process as set forth in claim 17 wherein insulating material is disposed between said first and second strip structures of said panel.

20. A process as set forth in claim 17 wherein a sealing material is applied to a surface of at least one said strip structure, thereby to form a sealed outwardly facing surface of said composite panel.

21. A process as set forth in claim 17 wherein said thread means comprise wires.

22. A process as set forth in claim 17 wherein the bar members are of wood with the wood grain extending lengthwise of the bar members.

23. A process for the production of composite panels comprising in combination:
   a. producing a first strip structure by applying a first sheet of gel coat on a first convex surface which is moved in longitudinal direction of said strip structure so that the sheet of gel coat is transported together with said surface,
   b. applying a mixture of hardenable plastic binding agent in a fluid condition together with fibres on this sheet,
   c. applying on this mixture a first row of first bar members of such a length that each end of said bar members is in the region of one of the two sides of said strip structure,
   d. pressing a substantial number of threads or wires which are arranged parallel to each other and which extend in longitudinal direction of said first strip structure in a stressed condition with a prestressing force against the upper surface of said first bar members which are moved slowly forward and winding them on said first bar members,
   e. producing a second strip structure by applying a second sheet of gel coat on a second convex surface which is moved in longitudinal direction of said strip structure so that the sheet of gel coat is transported together with said surface,
   f. applying a mixture of hardenable binding agent in a fluid condition together with fibres on said second sheet,
   g. applying on this mixture a second row of second bar members of such a length that each end of said second bar members is in the region of one of the two sides of said strip structure,
   h. pressing a substantial number of threads or wires which are arranged to each other and which extend in longitudinal direction of said second strip structure in a stressed condition with a prestressing force against a surface of said second bar members which are moved slowly forward and winding them on said first bar members,
   i. conducting both prefabricated strip structures in parallel so that both strip structures are facing,
   j. applying between the facing sides of both strip structures a layer for bonding the facing sides of both strip structures,
   k. pressing the two strip structures together until said layer are bonded by polymerisation of said layer.

24. A process as set forth in claim 23 comprising turning one of said two strip structures upside down before joining the two strip structures so that the side of one strip structure which had been facing the moved surface is after said turning not facing the side of said second strip structure which had been facing the second moved surface but its opposite side.

25. A process as set forth in claim 24 wherein said bar members are disposed at an acute angle with respect to the direction of movement of said strip structure.

26. A process as set forth in claim 25 wherein the inclined bar members of one said strip structure are disposed at an angle to the bar members of the other said strip structure, whereby the bar members of the two strip structures cross each other.

27. A process as set forth in claim 25 wherein said angle is less than 45°.

28. A process as set forth in claim 23 wherein said bar members are applied at an 90° angle with respect to the direction of movement of said strip structure.

29. A process as set forth in claim 23 wherein, before the two strip structures are joined together by said bonding layer, a plurality of reinforcing means which extend substantially in the direction of movement of the strip structures are inserted between the two strip structures, one beside another, in the direction of movement of the strip structure.

30. A process as set forth in claim 29 wherein insulating material is inserted in cavities between said reinforcing means.

31. A process as set forth in claim 23 wherein rhythmic forces are applied to said bar members which are pressed against said fiber-plastic binding agent layer.

32. A process as set forth in claim 23 wherein panels of insulating material are inserted in an uninterrupted succession between said two strip structures, the faces of said insulating material panels which are towards said two strip structures being covered with hardenable plastic material.

33. A process as set forth in claim 23 wherein said elongate composite panel configuration is cut into single composite panels.

34. A process as set forth in claim 23 wherein the bar members are of wood with the wood grain extending lengthwise of the bar members.

35. A process for the production of composite panels comprising in combination:
   a. producing a first strip structure by applying a first row of first bar members of such a length that each end if said bar members is in the region of one of the two sides of said strip structure on a convex surface which is moved in longitudial direction of said strip structure, so that said first row of bar members is transported together with said convex surface.
   b. pressing a substantial number of first threads or wires which are arranged parallel to each other in a stressed condition and which extend in longitudinal direction of said first strip structure with a prestressing force against the upper surface of said first bar members and winding them on said first bar members which are moved slowly forward along said convex surface,
   c. applying a mixture of hardenable plastic binding agent in a fluid condition together with fibres on said first bar members and said first threads or wires,
   d. producing a second strip structure by applying a second row of second bar members of such a length that each end of said bar members is in the region of one of the two sides of said strip structure on a convex surface which is moved in longitudinal direction of said strip structure, so that said second row of bar members is transported together with said convex surface.
   e. pressing a substantial number of second threads or wires which are arranged parallel to each other in stressed condition and which extend in longitudinal direction of said second strip structure with a prestressing force against the upper surface of said second bar members and winding them on said second bar members which are moved slowly forward along said convex surface,
   f. applying a mixture of hardenable binding agent in a fluid condition together with fibres on said second bar members and said second threads or wires,
   g. conducting both prefabricated strip structures in parallel so that both strip structures are facing,
   h. applying between the facing sides of both strip structures a layer for bonding the facing sides of both strip structures,
   i. pressing the two strip structures together until said layers are bonded by polymerization of said layer.

36. A process according to claim 35 comprising turning one of said two strip structures upside down before joining the two strip structures so that the side of one strip structure which had been facing the moved surface is after said turning not facing the side of said second strip structure which had been facing the second moved surface but its opposite side.

37. A process as set forth in claim 35 wherein said bar members are disposed at an acute angle with respect to the direction of movement of said strip structure.

38. A process as set forth in claim 37 wherein the inclined bar members of one said strip structure are disposed at an angle to the bar members of the other said strip structure, whereby the bar members of the two strip structures cross each other.

39. A process as set forth in claim 37 wherein said angle is less than 45°.

40. A process as set forth in claim 35 wherein said bar members are applied at an 90° angle with respect to the direction of movement of said strip structure.

41. A process as set forth in claim 35 wherein, before the two strip structures are joined together by said bonding layer, a plurality of reinforcing means which extend substantially in the direction of movement of the strip structures are inserted between the two strip structures, one beside another, in the direction of movement of the strip structure.

42. A process as set forth in claim 35 wherein insulating material is inserted in cavities between said reinforcing means.

43. A process as set forth in claim 35 wherein panels of insulating material are inserted in an uninterrupted succession between said two strip structures, the faces of said insulating material panels which are towards said two strip structures being covered with hardenable plastic material.

44. A process as set forth in claim 35 wherein said elongate composite panel configuration is cut into single composite panels.

45. A process as set forth in claim 35 wherein the bar members are of wood with the wood grain extending lengthwise of the bar members.

* * * * *